US012501237B2

(12) United States Patent
Li et al.

(10) Patent No.: US 12,501,237 B2
(45) Date of Patent: Dec. 16, 2025

(54) COMMUNICATION SYSTEM, METHOD AND DEVICE FOR MINIATURE INTELLIGENT SENSOR

(71) Applicant: DIGITAL GRID RES INST, CHINA SOUTHERN POWER GRID, Guangzhou (CN)

(72) Inventors: Peng Li, Guangzhou (CN); Xu Yin, Guangzhou (CN); Bing Tian, Guangzhou (CN); Min Guo, Guangzhou (CN); Zhiming Wang, Guangzhou (CN); Zhong Liu, Guangzhou (CN); Hongdi Sun, Guangzhou (CN); Jiguang Zhao, Guangzhou (CN); Licheng Li, Guangzhou (CN)

(73) Assignee: DIGITAL GRID RES INST, CHINA SOUTHERN POWER GRID, Guangzhou (CN)

( * ) Notice: Subject to any disclaimer, the term of this patent is extended or adjusted under 35 U.S.C. 154(b) by 498 days.

(21) Appl. No.: 18/013,041

(22) PCT Filed: Jun. 17, 2021

(86) PCT No.: PCT/CN2021/100488
§ 371 (c)(1),
(2) Date: Dec. 27, 2022

(87) PCT Pub. No.: WO2022/001674
PCT Pub. Date: Jan. 6, 2022

(65) Prior Publication Data
US 2023/0247388 A1 Aug. 3, 2023

(30) Foreign Application Priority Data
Jun. 29, 2020 (CN) .......................... 202010603273.0

(51) Int. Cl.
*H04W 4/06* (2009.01)
*H04W 4/80* (2018.01)
*H04W 88/16* (2009.01)

(52) U.S. Cl.
CPC ............... *H04W 4/06* (2013.01); *H04W 4/80* (2018.02); *H04W 88/16* (2013.01)

(58) Field of Classification Search
CPC ......... H04W 4/06; H04W 4/80; H04W 88/16; H04W 84/18; H04W 4/38; H04W 4/70; H04W 52/0209; H04L 69/08; Y02D 30/70
See application file for complete search history.

(56) References Cited

U.S. PATENT DOCUMENTS

2007/0116033 A1* 5/2007 Reunamaki ........... H04W 16/14
370/445
2020/0088871 A1 3/2020 Wennerberg
(Continued)

FOREIGN PATENT DOCUMENTS

CN 106412111 A 2/2017
CN 106713389 A 5/2017
(Continued)

OTHER PUBLICATIONS

International Search Report for corresponding Application No. PCT/CN2021/100488 dated Sep. 2, 2021, 5 pages.
(Continued)

*Primary Examiner* — Austin J Moreau
(74) *Attorney, Agent, or Firm* — Taft, Stettinius & Hollister LLP

(57) ABSTRACT

A communication system, method, and device for a miniature intelligent sensor. The communication system includes a sensor, a power gateway, and a power Internet of things (IoT) server. The sensor is configured to obtain sensor data and send the sensor data to the power gateway according to a Bluetooth communication protocol. The power gateway is configured to receive the sensor data and perform protocol conversion on the sensor data to obtain protocol conversion data adapted to a message queuing telemetry transport
(Continued)

(MQTT) protocol. The power gateway is configured to send the protocol conversion data to the power IoT server according to the MQTT protocol. The power IoT server is configured to receive the protocol conversion data and obtain server receiving data of the power IoT server according to the protocol conversion data.

6 Claims, 8 Drawing Sheets

(56) References Cited

U.S. PATENT DOCUMENTS

2020/0382933 A1\* 12/2020 Ono .................. H04W 4/80
2021/0389739 A1\* 12/2021 Nadumane ............ H04L 41/145

FOREIGN PATENT DOCUMENTS

| CN | 106878163 | A | | 6/2017 | |
| CN | 108696478 | A | | 10/2018 | |
| CN | 108711276 | A | \* | 10/2018 | ........ H02J 13/00001 |
| CN | 109451040 | A | | 3/2019 | |
| CN | 109936585 | A | | 6/2019 | |
| CN | 109981668 | A | | 7/2019 | |
| CN | 110213756 | A | | 9/2019 | |
| CN | 209446133 | U | | 9/2019 | |
| CN | 110580588 | A | | 12/2019 | |
| CN | 110769367 | A | | 2/2020 | |
| CN | 110943914 | A | | 3/2020 | |
| CN | 111010309 | A | | 4/2020 | |
| CN | 111726769 | A | | 9/2020 | |
| JP | 2021095960 | A | \* | 6/2021 | |
| KR | 102177201 | B1 | \* | 11/2020 | ............ H04W 28/06 |
| WO | 2020112187 | A1 | | 6/2020 | |

OTHER PUBLICATIONS

Written Opinion for corresponding Application No. PCT/CN2021/100488 dated Sep. 2, 2021, 4 pages.
Chinese Office Action for corresponding Application No. 202010603273.0 dated Dec. 10, 2020, 9 pages.
Chinese Office Action for corresponding Application No. 202010603273.0 dated Feb. 18, 2021, 11 pages.

\* cited by examiner

COMMUNICATION SYSTEM, METHOD AND DEVICE FOR MINIATURE INTELLIGENT SENSOR

CROSS REFERENCE TO RELATED APPLICATIONS

This is a U.S. National Stage application of, and claims priority to, PCT/CN2021/100488, filed Jun. 17, 2021, which further claims priority to Chinese Patent Application No. 202010603273.0, filed Jun. 29, 2020, the disclosures of which are incorporated herein by reference in their entirety.

TECHNICAL FIELD

The present application relates to the field of Internet of things (IoT) technologies, and in particular, to a communication system, method and device for a miniature intelligent sensor, a computer apparatus, and a storage medium.

BACKGROUND

With the development of technologies such as magnetoresistive sensors and microelectronics, a low-power, compact and intelligent miniature intelligent sensor appears. The miniature intelligent sensor has the advantages of a small size, a light weight, a large dynamic range, high measurement accuracy, and a wide frequency band response. Moreover, high and low voltages are completely isolated, no high open-circuit voltage exists on a lower voltage side, security is high, no iron core is included, a problem of magnetic saturation can be eliminated, data transmission has strong anti-electromagnetic interference performance, and an oil-free structure is adopted, which may not bring potential risks of inflammability and explosibility due to oil filling. Based on the above advantages, the miniature intelligent sensor has the potential to replace a conventional transformer, and application thereof to a digital substation can realize sensing of current information of key nodes of a distribution network, and then a "nervous system" of a power grid is built, which is conducive to transparency of an intelligent power grid. The introduction of the miniature intelligent sensor may change an interface manner of automation equipment in the substation and an operation mode of independent collection of analog quantity of the equipment, which affects an automation structure mode and a relay protection mode of the substation and even the development of the whole power system to some extent.

However, a power miniature intelligent sensor network using the miniature intelligent sensor encounters two obstacles during the development. Firstly, apparatus that detects and senses a power environment in a conventional power grid generally acquires an operating power supply from a power distribution room and communicates with a power gateway through a wired link. If the miniature intelligent sensor adopts conventional energy acquisition and communication manners, volumes of a power supply module and a communication module may increase, and communication power consumption is high. Therefore, batteries are required to be replaced frequently, which is inconvenient for operation and maintenance. Meanwhile, the miniature intelligent sensor has poor compatibility of data communication, and cannot be connected and fused with the automation equipment in the substation. Secondly, a conventional IoT gateway accesses the Internet through a Hyper Text Transfer Protocol (HTTP), and remote users can log in to the IoT gateway and monitor equipment such as a sensor through a web page. However, such a communication mode requires a client to acquire gateway data through continuous polling, which has low efficiency and poor real-time performance. In addition, the HTTP has a high overhead and is not suitable for low-bandwidth and high-delay IoT communication scenarios.

Therefore, current communication technologies applied to the miniature intelligent sensor have the problems of high power consumption, poor real-time performance, and low efficiency.

SUMMARY

Based on the above, there is a need to provide, with respect to the above technical problems, a communication system with low power consumption, low delay, and high transmission efficiency applied to a miniature intelligent sensor, a method, a device, a computer apparatus, and a storage medium.

A communication system for a miniature intelligent sensor is provided. The communication system includes a sensor, a power gateway, and a power IoT server;

The sensor is configured to obtain sensor data and send the sensor data to the power gateway according to a Bluetooth communication protocol.

The power gateway is configured to receive the sensor data and perform protocol conversion on the sensor data to obtain protocol conversion data. The protocol conversion data is adapted to a message queuing telemetry transport (MQTT) protocol; The power gateway is further configured to send the protocol conversion data to the power IoT server according to the MQTT protocol.

The power IoT server is configured to receive the protocol conversion data and obtain server receiving data of the power IoT server according to the protocol conversion data.

In an embodiment, the sensor is further configured to, when the communication system is started, enter an initialization state to perform an initialization operation on the sensor; when the initialization operation is completed, switch from the initialization state to a standby state to allow the sensor to wait for a broadcast communication instruction; when receiving the broadcast communication instruction, switch from the standby state to a broadcast state to allow the sensor to establish a data communication connection with the power gateway; when the sensor establishes the data communication connection with the power gateway, switch from the broadcast state to a connection state to allow the sensor to perform data communication with the power gateway; and when the data communication is idle, return from the connection state to the standby state.

In an embodiment, the sensor is further configured to, when switching from the standby state to the broadcast state, send a broadcast packet on a preset broadcast channel according to a preset broadcast time interval. The broadcast time interval including a fixed time interval and a pseudo-random time interval.

The power gateway is further configured to scan the broadcast channel according to a preset scan time interval and identify the broadcast packet sent by the sensor.

In an embodiment, the sensor is further configured to, when switching from the broadcast state to the connection state, send a read/write characteristic value request to the power gateway.

The power gateway is further configured to, when receiving the read/write characteristic value request, obtain a characteristic value according to the read/write characteristic value request, and feed the characteristic value back to the sensor.

In an embodiment, the power gateway is further configured to, when the sensor is switched from the broadcast state to the connection state, acquire a characteristic value, and send the characteristic value to the sensor.

In an embodiment, the power gateway is further configured to: perform a gateway initialization operation; when receiving a gateway parameter setting instruction sent by a user, perform gateway parameter setting of the power gateway according to the gateway parameter setting instruction; when receiving a label read/write instruction sent by the user, determine a sensor corresponding to the label read/write instruction to obtain a target sensor, so as to allow the power gateway to establish a data communication connection with the target sensor and perform a read/write operation on the target sensor according to the label read/write instruction; and if no gateway parameter setting instruction or label read/write instruction is received or the gateway parameter setting and the read/write operation is completed, scan the broadcast channel according to the preset scan time interval and identify the broadcast packet sent by the sensor.

In an embodiment, the gateway initialization operation includes a server connection initialization operation and a sensor connection initialization operation. The power gateway is further configured to perform the server connection initialization operation, so as to allow the power gateway to establish a data communication connection with the power IoT server and log in to the power IoT server. The power gateway is further configured to perform the sensor connection initialization operation, so as to allow the power gateway to scan the broadcast packet sent by the sensor, or establish a data communication connection with the sensor.

In an embodiment, the power gateway is further configured to, when receiving the gateway parameter setting instruction, acquire a gateway login password of the power gateway, and verify the gateway login password; if the verification is successful, obtain a gateway parameter setting value of the power gateway according to the gateway parameter setting instruction, and judge whether the gateway parameter setting value is legitimate; and if the gateway parameter setting value is legitimate, update the gateway parameter according to the gateway parameter setting value, and return an update success identifier.

A communication method for a miniature intelligent sensor is also provided. The method includes:
receiving sensor data sent by a sensor according to a Bluetooth communication protocol;
performing protocol conversion on the sensor data to obtain protocol conversion data adapted to an MQTT protocol; and
sending the protocol conversion data to a power IoT server according to the MQTT protocol, so as to allow the power IoT server to receive the protocol conversion data, and obtaining server receiving data of the power IoT server according to the protocol conversion data.

In an embodiment, the method further includes:
performing a gateway initialization operation;
when receiving a gateway parameter setting instruction sent by a user, performing gateway parameter setting of the power gateway according to the gateway parameter setting instruction;
when receiving a label read/write instruction sent by the user, determining a sensor corresponding to the label read/write instruction to obtain a target sensor, so as to allow the power gateway to establish a data communication connection with the target sensor and perform a read/write operation on the target sensor according to the label read/write instruction; and
if no gateway parameter setting instruction or label read/write instruction is received or the gateway parameter setting and the read/write operation is completed, scanning the broadcast channel according to a preset scan time interval and identifying a broadcast packet sent by the sensor.

A communication device for a miniature intelligent sensor is further provided. The device includes:
a receiving module configured to receive sensor data sent by a sensor according to a Bluetooth communication protocol;
a protocol conversion module configured to perform protocol conversion on the sensor data to obtain protocol conversion data adapted to an MQTT protocol; and
a sending module configured to send the protocol conversion data to a power IoT server according to the MQTT protocol, so as to allow the power IoT server to receive the protocol conversion data, and obtaining server receiving data of the power IoT server according to the protocol conversion data.

A computer apparatus, including a memory and a processor, the memory storing a computer program, and the processor executing the computer program to implement the following steps:
receiving sensor data sent by a sensor according to a Bluetooth communication protocol;
performing protocol conversion on the sensor data to obtain protocol conversion data adapted to an MQTT protocol; and
sending the protocol conversion data to a power IoT server according to the MQTT protocol, so as to allow the power IoT server to receive the protocol conversion data, and obtaining server receiving data of the power IoT server according to the protocol conversion data.

A computer-readable storage medium, storing a computer program, the computer program, when executed by a processor, causing the processor to implement the following steps:
receiving sensor data sent by a sensor according to a Bluetooth communication protocol;
performing protocol conversion on the sensor data to obtain protocol conversion data adapted to an MQTT protocol; and
sending the protocol conversion data to a power IoT server according to the MQTT protocol, so as to allow the power IoT server to receive the protocol conversion data, and obtaining server receiving data of the power IoT server according to the protocol conversion data.

According to the communication system, method and device for the miniature intelligent sensor, the computer apparatus, and the storage medium, the sensor obtains sensor data and sends the sensor data to the power gateway according to a Bluetooth communication protocol, which can reduce power consumption of communication between the sensor and the power gateway. The power gateway receives the sensor data and performs protocol conversion on the sensor data to obtain protocol conversion data, and sends the protocol conversion data to the power IoT server according to the MQTT protocol, which can improve efficiency of and reduce delay of communication between the power gateway and the power IoT server. The power IoT server receives the protocol conversion data and obtains server receiving data of the power IoT server according to the protocol conversion data, which enables the communication system applied to the miniature intelligent sensor to have low power consumption, low delay, and higher transmission efficiency.

DETAILED DESCRIPTION OF THE EMBODIMENTS

In order to make the objective, technical solutions, and advantages of the present application clearer, the present application is described below in further detail with reference to the accompanying drawings and embodiments. It is to be understood that specific embodiments described herein are intended only to explain the present application and not to limit the present application.

Figure 1:
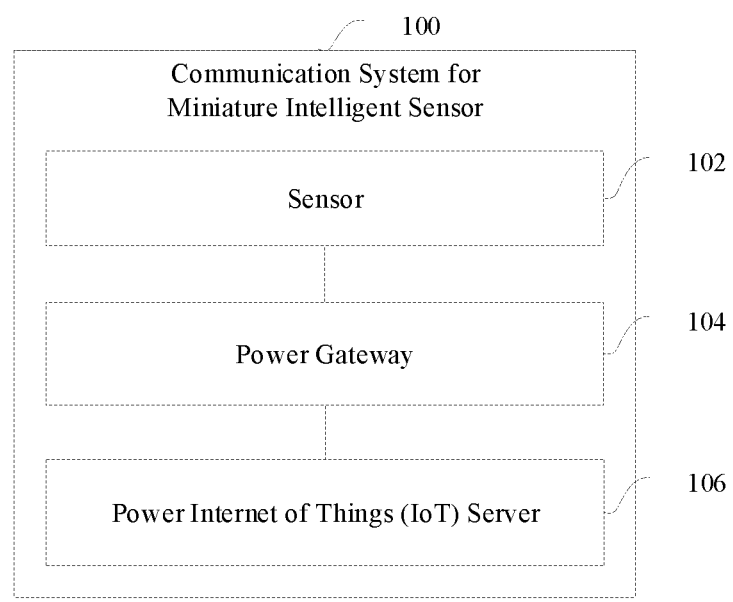
FIG. 1 is a block diagram illustrating a configuration of a communication system for a miniature intelligent sensor according to an embodiment.

In an embodiment, as shown in FIG. 1, a communication system 100 for a miniature intelligent sensor is provided, which is applicable to an intelligent power grid. The communication system 100 specifically includes a sensor 102, a power gateway 104, and a power IoT server 106.

The sensor 102 may be, but is not limited to, a variety of miniature intelligent sensors and low power sensor devices for detecting and sensing a power environment of a substation. For example, the sensor 102 may be a voltage sensor, a humidity sensor, a voltage sensor, or a current sensor deployed in the substation. The power gateway 104 may be, but is not limited to, an intelligent power gateway. The power IoT server 106 may be, but is not limited to, a cloud server, which may be implemented by a standalone server or a server cluster formed by a plurality of servers.

The sensor 102 is configured to obtain sensor data and send the sensor data to the power gateway 104 according to a Bluetooth communication protocol.

The sensor data includes a variety of data detected and sensed by the sensor 102.

In specific implementation, the sensor 102 and the power gateway 104 may communicate with each other by using low power Bluetooth. The miniature intelligent sensors and the low power sensor devices, after detecting or sensing the sensor data, send the sensor data to the power gateway 104 through Bluetooth. The power gateway 104 may also send data in the gateway to the sensor 102 through Bluetooth. The above Bluetooth communication is implemented based on a Bluetooth communication protocol.

The power gateway 104 is configured to receive the sensor data and perform protocol conversion on the sensor data to obtain protocol conversion data adapted to an MQTT protocol. The power gateway is configured to send the protocol conversion data to the power IoT server 106 according to the MQTT protocol.

In specific implementation, the power gateway 104 and the power IoT server 106 may communicate with each other according to the MQTT protocol. The power gateway 104 may be provided with a low power Bluetooth access layer, a protocol conversion control layer, and a wide area access layer. The power gateway 104 may access the sensor 102 through the low power Bluetooth access layer, and access the power IoT server 106 through the wide area access layer. The power gateway 104, after receiving the sensor data through the low power Bluetooth access layer, may perform protocol conversion on the sensor data through the protocol conversion control layer to obtain the protocol conversion data. The protocol conversion data matches the MQTT protocol. The power gateway 104 may transmit the protocol conversion data to the power IoT server 106 through the wide area access layer according to the MQTT protocol. The power IoT server 106 may also transmit data in the server to the power gateway 104 according to the MQTT protocol.

The power IoT server 106 is configured to receive the protocol conversion data and obtain server receiving data of the power IoT server 106 according to the protocol conversion data.

In specific implementation, under an MQTT application layer protocol, the power IoT server 106 may receive the protocol conversion data sent by the power gateway 104 by networking such as a network cable, Wi-Fi, a General Packet Radio Service (GPRS) or Narrow Band Internet of Things (NB-IoT), and use the received protocol conversion data as the server receiving data for the power IoT server 106 to perform subsequent data processing.

Figure 2:
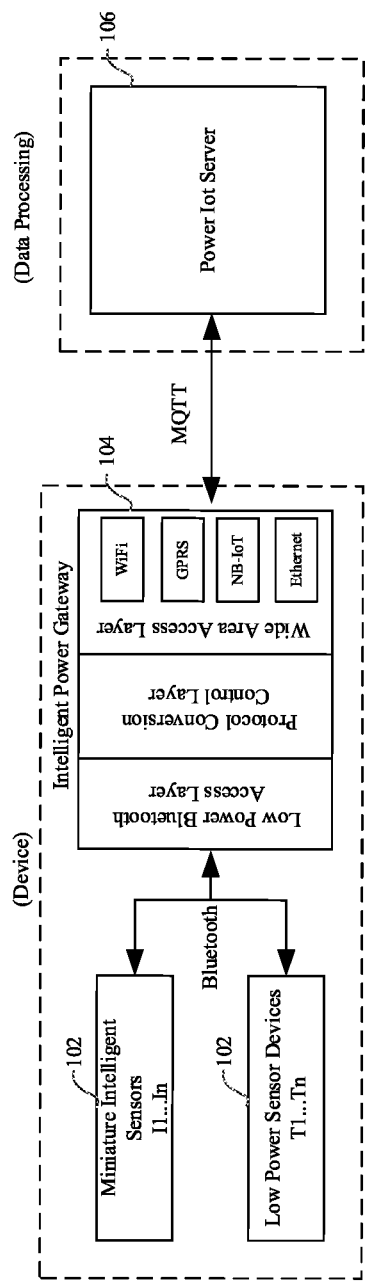
FIG. 2 is a schematic diagram illustrating a communication system for a miniature intelligent sensor according to an embodiment.

In practical applications, as shown in FIG. 2, a schematic diagram illustrating a communication system 100 for a miniature intelligent sensor is provided. The sensor 102 includes n1 miniature intelligent sensors, denoted as $I_1, \ldots, I_{n1}$ respectively. The miniature intelligent sensors are small-sized and lightweight intelligent sensor devices that perform detection and sensing in a non-contact manner, which mainly acquire energy from batteries. The sensor 102 further includes n2 low power sensor devices, denotes as $T_1, \ldots, T_{n2}$ respectively. The low power sensor devices have basically the same functions as the miniature intelligent sensors, but have volumes greater than those of the miniature intelligent sensors. The power gateway 104 is an intelligent power gateway, and may be provided with more than two network interfaces. One network interface may realize communication with the sensor 102, and the other network interface may realize access of an Ethernet or a wireless network to upper-layer power IoT. The intelligent power gateway serves as a connecting link between the preceding and the following. The gateway may be provided with a low power Bluetooth access layer, a protocol conversion control layer, and a wide area access layer. The low power Bluetooth access layer supports a low power Bluetooth protocol, can access the miniature intelligent sensors and the low power sensor devices in a friendly way, and is responsible for establishing a data transmission channel between the sensor and the intelligent power gateway to realize a data reading and writing function. The protocol conversion layer is responsible for protocol conversion between a low power Bluetooth network and the wide area access layer, and converts data communication from a Bluetooth protocol to a target protocol (e.g., MQTT protocol) required by the power IoT, so as to realize heterogeneous interconnection between the low power Bluetooth network and a wide area access layer communication network. The wide area access layer is responsible for establishing a connection with the power IoT server 106, and accessing a specific communication network according to user configuration. Specifically, networking may be performed via a network cable, Wi-Fi, a GPRS or NB-IoT.

According to the above communication system, the sensor obtains sensor data and sends the sensor data to the power gateway according to a Bluetooth communication protocol, which can reduce power consumption of communication between the sensor and the power gateway. The power gateway receives the sensor data and performs protocol conversion on the sensor data to obtain protocol conversion data, and sends the protocol conversion data to the power IoT server according to the MQTT protocol, which can improve efficiency of and reduce delay of communication between the power gateway and the power IoT server. The power IoT server receives the protocol conversion data and obtains server receiving data of the power IoT server according to the protocol conversion data, which enables the communication system applied to the miniature intelligent sensor to have low power consumption, low delay, and higher transmission efficiency.

In an embodiment, the sensor and the power gateway may communicate with each other through Wi-Fi, ZigBee or Bluetooth. Wi-Fi has a limited communication range, poor stability, high power consumption, and poor networking capability and security. ZigBee has a low data transmission rate, a small effective range, poor anti-interference performance, and a protocol that is not open-source, and is relatively complex in terms of connection with an IP protocol. Bluetooth has low power consumption, a wide coverage, intelligent connection, high security, and a small module size, and is easy to integrate. In view of this, transmission power consumption can be reduced by adopting Bluetooth communication between the sensor and the power gateway.

In an embodiment, the power gateway may access the power IoT server 106 through an HTTP, a WebSocket (transmission control protocol (TCP)-based full duplex communication protocol), The constrained application protocol (CoAP), or an MQTT protocol. The HTTP has low efficiency, poor real-time performance, and a high protocol overhead, and thus is not suitable for low-bandwidth and high-delay IoT communication scenarios. The WebSocket protocol also has a high overhead, and is not suitable for low-bandwidth and high-delay IoT communication scenarios. The CoAP is implemented based on a user datagram protocol (UDP), and is mainly used as a communication protocol for low power devices such as sensors, but is not suitable for devices such as computers and mobile phones and has poor compatibility. The MQTT protocol is implemented based on the TCP, which may be used as a communication protocol for low power devices such as sensors and a communication protocol for devices such as computers and smart phones. In view of this, the access of the power gateway to the power IoT server through the MQTT protocol can reduce transmission delay, improve transmission efficiency, improve system compatibility, and achieve reliable data transmission.

In an embodiment, the low power Bluetooth operates at a frequency band of 2.4 GHz. The operating frequency band of Bluetooth may be divided into 40 channels in units of 2 MHz, and the channels are numbered 0 to 39 respectively. Channels 37 to 39 may be used as broadcast channels for broadcast communication, and channels 0 to 36 may be used as data channels for data communication after a connection is established between the sensor and the power gateway. An extended broadcast communication mode is added to Bluetooth 5.0, which can further enhance broadcast communication capability of the low power Bluetooth. In this mode, a periodic broadcast communication mechanism is added, under which an original data channel is extended as a broadcast channel. In this case, the original channels 37 to 39 may still be used as the broadcast channels, while channels 0 to 36 may be used as both the data channels and the broadcast channels.

In an embodiment, the sensor is further configured to, when the communication system is started, enter an initialization state to perform an initialization operation on the sensor; when the initialization operation is completed, switch from the initialization state to a standby state to allow the sensor to wait for a broadcast communication instruction; when receiving the broadcast communication instruction, switch from the standby state to a broadcast state to allow the sensor to establish a data communication connection with the power gateway; when the sensor establishes the data communication connection with the power gateway, switch from the broadcast state to a connection state to allow the sensor to perform data communication with the power gateway; and when the data communication is idle, return from the connection state to the standby state.

The broadcast communication instruction is an instruction to indicate broadcast communication between the sensor and the power gateway when a communication task arrives.

In specific implementation, a link layer state machine may be provided for the low power Bluetooth. The state machine includes four states: an initialization state, a standby state, a broadcast state, and a connection state. When the communication system is started or reset, the sensor enters the initialization state and performs the initialization operation on the sensor. When completing the initialization operation, the sensor may switch from the initialization state to the standby state. In the state, the sensor waits for a broadcast communication instruction. When receiving the broadcast communication instruction, the sensor may switch from the standby state to the broadcast state, perform broadcast communication with the power gateway, and establish a data communication connection. In the above process, the sensor may return from the standby state to the initialization state (e.g., when the sensor has degraded performance and is required to be re-initialized), and may also return from the broadcast state to the standby state (e.g., when the broadcast task is completed and no data communication is required). When the data communication connection is established, the sensor may switch from the broadcast state to the connection state. In the state, the sensor performs data communication with the power gateway. When the data communication is idle, in order to reduce power consumption, the sensor may return from the connection state to the standby state, and wait for the broadcast communication instruction again. When next communication task arrives, the sensor may enter the broadcast state according to the broadcast communication instruction, and return to the standby state or enter the connection state again as required by the task.

In this embodiment, when the communication system is started, the sensor enters an initialization state to perform an initialization operation on the sensor. When the initialization operation is completed, the sensor switches from the initialization state to a standby state to allow the sensor to wait for a broadcast communication instruction. When receiving the broadcast communication instruction, the sensor switches from the standby state to a broadcast state to allow the sensor to establish a data communication connection with the power gateway. When the sensor establishes the data communication connection with the power gateway, the sensor switches from the broadcast state to a connection state to allow the sensor to perform data communication with the power gateway. When the data communication is idle, the sensor returns from the connection state to the standby state. In this way, it can reduce complexity of the state switching process of the sensor and reduce power consumption of the sensor on the basis of ensuring communication quality.

In an embodiment, the sensor is further configured to, when switching from the standby state to the broadcast state, send a broadcast packet on a preset broadcast channel according to a preset broadcast time interval. The broadcast time interval includes a fixed time interval and a pseudo-random time interval. The power gateway is further configured to scan the broadcast channel according to a preset scan time interval and identify the broadcast packet sent by the sensor.

The broadcast packet is a data packet sent in the broadcast communication.

Figure 3:
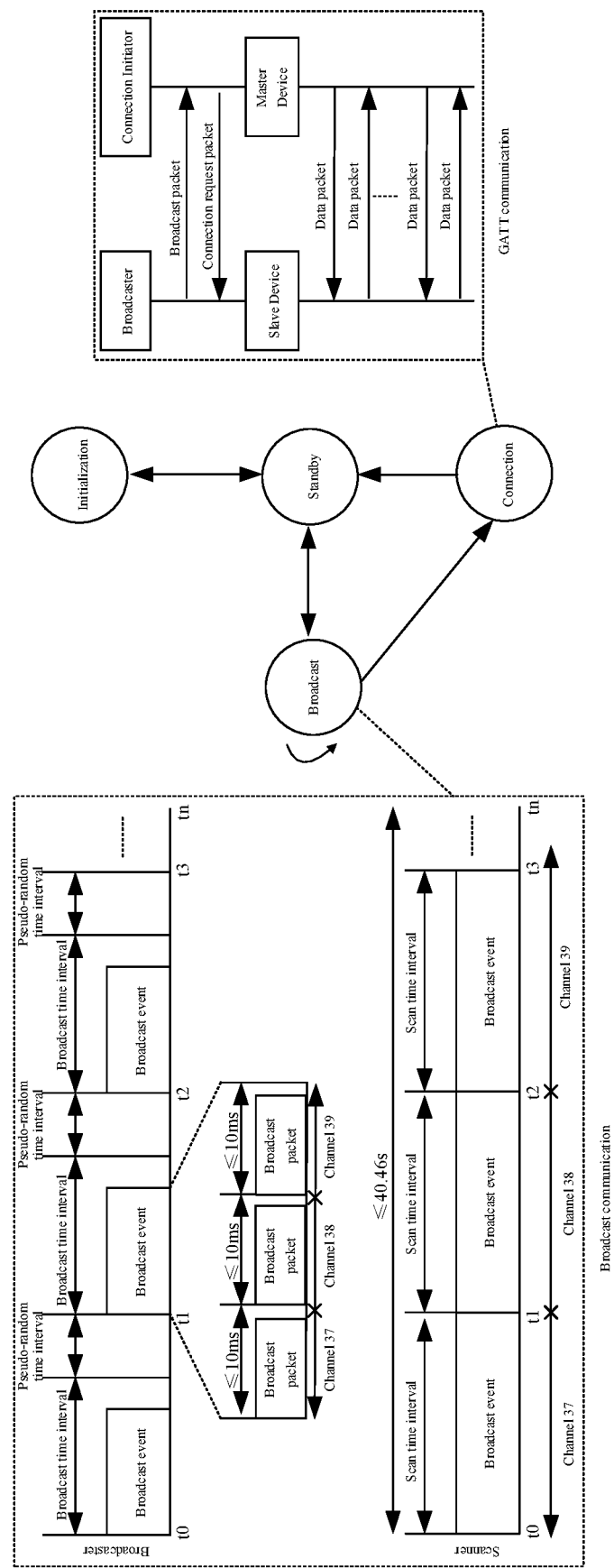
FIG. 3 is a schematic diagram illustrating a communication state and a communication manner of the communication system according to an embodiment.

In specific implementation, as shown in FIG. 3, a schematic diagram illustrating a communication state and a communication manner of the communication system is provided. The communication manner of the low power Bluetooth may include a broadcast communication manner, corresponding to the broadcast state in the link layer state machine. When switching from the standby state to the broadcast state, the sensor may send the broadcast packet on preset broadcast channels (e.g., channels 37 to 39) according to a preset broadcast time interval. The broadcast time interval may be formed by a fixed time interval and a pseudo-random time interval. The power gateway scans the broadcast channels according to a preset scan time interval. When it is detected that a broadcast packet is sent in the broadcast channels, the broadcast packet sent by the sensor is identified.

In practical applications, as shown in FIG. 3, in the broadcast communication manner, the miniature intelligent sensor operates in the broadcast state as a broadcaster, and the intelligent power gateway operates in a scanning state as a scanner. Instead of establishing a Bluetooth connection, the broadcaster and the scanner realize broadcast communication through a broadcast/scan mechanism. During the broadcast communication, the broadcaster can only send the broadcast packet and the scanner can only receive the broadcast packet, so the communication therebetween is unidirectional. In order to reduce the power consumption of the miniature intelligent sensor, only a basic mode can be used. In the basic mode, the miniature intelligent sensor sends the broadcast packet on broadcast channels 37 to 39 at certain time intervals. A maximum time interval may be 10485.759375 s. In addition, in order to prevent conflicts caused by a same time interval of a plurality of broadcasters, a pseudo-random time interval automatically generated by the device may be added to a fixed time interval set by the user for an actual broadcast time interval. The pseudo-random time interval may range from 0 ms to 10 ms. The intelligent power gateway performs scanning continuously for a period of time on the broadcast channels 37-39 at certain time intervals in turn. A maximum scan time length may be 40.96 s. In order to ensure the communication quality, the channel can be adaptively controlled during the communication. For example, when the broadcast communication is interrupted, a broadcast channel can be reallocated to the broadcast communication. During the channel reallocation, a bandwidth requirement of the user may be checked first, whether available channel resources still exist is then detected, and finally allocation is performed according to the available channel resources or a priority of the user requirement. It is to be noted that, since the intelligent power gateway can acquire energy from a normal external power supply without considering low power operation, the intelligent power gateway can adopt a continuous scanning manner with a scan time window equal to a scan time interval.

In this embodiment, the sensor sends a broadcast packet on a preset broadcast channel according to a preset broadcast time interval when switching from the standby state to the broadcast state, and the power gateway scans the broadcast channel according to a preset scan time interval and identifies the broadcast packet sent by the sensor, which can reduce complexity of the broadcast communication of the sensor and power consumption of the sensor on the basis of ensuring the communication quality.

In an embodiment, the sensor is further configured to, when switching from the broadcast state to the connection state, send a read/write characteristic value request to the power gateway. The power gateway is further configured to, when receiving the read/write characteristic value request, obtain a characteristic value according to the read/write characteristic value request, and feed the characteristic value back to the sensor.

In specific implementation, as shown in FIG. 3, the communication manner of the low power Bluetooth may further include a Generic Attribute Profile (GATT) communication manner, corresponding to the connection state in the link layer state machine. When the sensor switches from the broadcast state to the connection state, the sensor may send the read/write characteristic value request to the power gateway. When receiving the read/write characteristic value request, the power gateway determines a characteristic value corresponding to the read/write characteristic value request and feeds the characteristic value back to the sensor, or the power gateway may further update the corresponding characteristic value according to the read/write characteristic value request.

In practical applications, the miniature intelligent sensor and the intelligent power gateway can realize bidirectional communication by establishing a GATT connection. GATT is a general specification for sending/receiving low power Bluetooth data based on a low power Bluetooth connection. When the miniature intelligent sensor and the intelligent power gateway establish a connection, the miniature intelligent sensor may be used as a GATT client, and the intelligent power gateway may be used as a GATT server, or the miniature intelligent sensor may be used as a GATT server and the intelligent power gateway may be used as a GATT client. The GATT server is a device that provides a data service. The GATT client is a device that reads and uses server application data. Similarly, from the perspective of a link layer, a master device and a slave device in Bluetooth communication in the connection state may both serve as GATT clients or GATT servers. From the perspective of a broadcast scanning process, both the broadcaster and the scanner may serve as GATT clients or GATT servers.

In an embodiment, when switching from the broadcast state to the connection state, the sensor sends a read/write characteristic value request to the power gateway, and when receiving the read/write characteristic value request, the power gateway obtains a characteristic value according to the read/write characteristic value request, and feeds the characteristic value back to the sensor, which can reduce complexity of the data communication of the sensor and power consumption of the sensor on the basis of ensuring the communication quality.

In an embodiment, the power gateway is further configured to, when the sensor is switched from the broadcast state to the connection state, acquire a characteristic value, and send the characteristic value to the sensor.

In specific implementation, when the sensor switches from the broadcast state to the connection state and is in GATT communication, the sensor is not required to send the read/write characteristic value request to the power gateway, the power gateway can directly send the characteristic value to the sensor after determining the characteristic value, and the sensor is not required to feed the characteristic value back to the power gateway after receiving the characteristic value.

Figure 4:
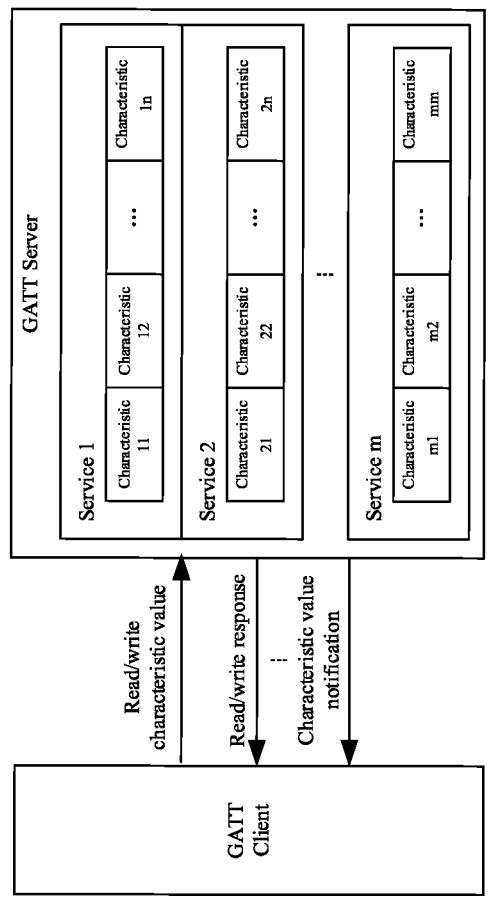
FIG. 4 is a schematic diagram illustrating a data communication process in a connection state according to an embodiment.

In practical applications, as shown in FIG. 4, a schematic diagram illustrating a data communication process in a connection state is provided. In the GATT server, a configuration file may include a plurality of services (e.g., a service 1, a service 2, ..., a service m) each of which may be used to perform a specific function, and a set of a series of data formed by data structures of a plurality of characteristics (e.g., a characteristic 11, a characteristic 12, ..., a characteristic 1n). The characteristics are values used by services. Two parties of GATT communication can realize data exchange by reading and writing characteristic values. For example, the GATT client and the server can communicate in two manners. In the first manner, the GATT client may send a read/write characteristic value request to the server. When receiving the read/write characteristic value request, the server returns the corresponding characteristic value to the client according to the read/write characteristic value request (the server sends a read/write response to the client), or the server may further update the corresponding characteristic value according to the read/write characteristic value request. In the second manner, the GATT client may not send any read/write characteristic value request to the server, the server may directly send the characteristic value to the client (the server sends a characteristic value notification to the client), and the client is not required to feed back the characteristic value to the server after receiving the characteristic value.

In this embodiment, when the sensor switches from the broadcast state to the connection state, the power gateway acquires a characteristic value, and sends the characteristic value to the sensor, which can reduce complexity of the data communication of the sensor and power consumption of the sensor on the basis of ensuring the communication quality.

In an embodiment, the power gateway is further configured to: perform a gateway initialization operation; when receiving a gateway parameter setting instruction sent by a user, perform gateway parameter setting of the power gateway according to the gateway parameter setting instruction; when receiving a label read/write instruction sent by the user, determine a sensor corresponding to the label read/write instruction to obtain a target sensor, so as to allow the power gateway to establish a data communication connection with the target sensor and perform a read/write operation on the target sensor according to the label read/write instruction; and if no gateway parameter setting instruction or label read/write instruction is received or the gateway parameter setting and the read/write operation is completed, scan the broadcast channel according to the preset scan time interval and identify the broadcast packet sent by the sensor.

In specific implementation, when the power gateway is powered off or reset and restarted, a turn-on operation is performed, and then the gateway initialization operation is performed to initialize a hardware system of the gateway. The power gateway can receive an instruction sent by the user through an Internet interface. The instruction sent by the user may include a gateway parameter setting instruction and a label read/write instruction. When receiving the gateway parameter setting instruction, the power gateway may start a gateway manager to perform a user-specified parameter setting operation. When receiving the label read/write instruction, the power gateway may start a label manager to establish a connection with a specified label and perform a user-specified label read/write operation. When not receiving a user instruction or completing a corresponding operation according to a user instruction, the power gateway may enter an automatic scan mode to perform a Bluetooth label broadcast data processing program, scan the broadcast channel according to the preset scan time interval, and identify the broadcast packet sent by the sensor. After completion of label broadcast data processing or when the power gateway exits the automatic scan mode, the power gateway may repeat the above process in this embodiment.

In this embodiment, the power gateway performs a gateway initialization operation. When receiving a gateway parameter setting instruction sent by a user, the power gateway performs gateway parameter setting of the power gateway according to the gateway parameter setting instruction. When receiving a label read/write instruction sent by the user, the power gateway determines a sensor corresponding to the label read/write instruction to obtain a target sensor, so as to allow the power gateway to establish a data communication connection with the target sensor, and performs a read/write operation on the target sensor according to the label read/write instruction. If no gateway parameter setting instruction or label read/write instruction is received or the gateway parameter setting and the read/write operation is completed, the power gateway scans the broadcast channel according to the preset scan time interval and identifies the broadcast packet sent by the sensor. In this way, it enables the communication between the sensor and the power gateway to have high reliability, low complexity, and low power consumption, enables the communication system applied to the miniature intelligent sensor to be easy to install, operate, and maintain, and reduces workload of operation and maintenance personnel in a power department.

In an embodiment, the gateway initialization operation includes a server connection initialization operation and a sensor connection initialization operation. The power gateway is further configured to perform the server connection initialization operation, so as to allow the power gateway to establish a data communication connection with the power IoT server and log in to the power IoT server. The power gateway is further configured to perform the sensor connection initialization operation, so as to allow the power gateway to scan the broadcast packet sent by the sensor, or establish a data communication connection with the sensor.

In specific implementation, after being turned on, the power gateway may perform the server connection initialization operation to initialize a connection between the power gateway and the power IoT server, and then the power gateway may establish the connection with the power IoT server and perform data communication. The power gateway may further perform the sensor initialization operation to initialize a connection between the power gateway and the sensor, and then the power gateway may establish the connection with the sensor and perform broadcast communication or data communication.

In practical applications, during the initialization of the hardware system by the power gateway, firstly, the power gateway may start an initialization program to initialize a main control chip. The initialization may include cache allocation and communication interface initialization. Then, the main control chip initializes an Internet access module according to gateway parameter configuration information stored internally, including selection of a communication module (Ethernet, Wi-Fi, a GPRS, NB-IoT), establishment of TCP connection with an MQTT server, login, and the like. After successfully logging in to the MQTT server, the main control chip may start to initialize a low power Bluetooth module, including scanning parameter setting, connection parameter setting, and the like. Finally, the main control chip may control the low power Bluetooth module to start scanning or establish a connection with a Bluetooth label to complete initialization of the entire hardware and software system.

In this embodiment, the power gateway performs the server connection initialization operation, so as to allow the power gateway to establish a data communication connection with the power IoT server and log in to the power IoT server, which can ensure reliable communication between the power gateway and the power IoT server. The power gateway performs the sensor connection initialization operation, so as to allow the power gateway to scan the broadcast packet sent by the sensor, or establish a data communication connection with the sensor, which can ensure reliable communication between the power gateway and the sensor.

In an embodiment, the power gateway is further configured to: when receiving the gateway parameter setting instruction, acquire a gateway login password of the power gateway, and verify the gateway login password; if the verification is successful, obtain a gateway parameter setting value of the power gateway according to the gateway parameter setting instruction, and judge whether the gateway parameter setting value is legitimate; and if the gateway parameter setting value is legitimate, update the gateway parameter according to the gateway parameter setting value, and return an update success identifier.

In specific implementation, the power gateway, when receiving the gateway parameter setting instruction sent by the user, may set the gateway parameter according to the instruction. The user may enter the gateway login password to the power gateway, and the power gateway may verify the gateway login password. If the verification is successful, parameter setting of the power gateway may be performed according to the gateway parameter setting instruction. The power gateway may acquire the gateway parameter setting value and judge whether the gateway parameter setting value is legitimate. If the gateway parameter setting value is legitimate, the power gateway may update the gateway parameter according to the gateway parameter setting value and return the update success identifier, and if the gateway parameter setting value is not legitimate, the power gateway may not change the parameter setting of the power gateway and return a parameter setting failure identifier.

In practical applications, the user's parameter setting transactions for the intelligent power gateway may include MQTT server domain name setting, TCP port setting, Wi-Fi service set identifier (SSID) and password setting, gateway login password setting, networking mode selection, networking mode priority setting, gateway operation mode setting, Bluetooth scanning parameter setting, and Bluetooth connection parameter setting. In order to prevent unauthorized users from changing operation parameters of the intelligent power gateway, the user is required to first enter the gateway login password before changing operation parameters of the Bluetooth gateway. If the password is entered correctly, the intelligent power gateway may enter an operation parameter setting mode, and the user may update operation parameters of the gateway. When receiving a new parameter value, the intelligent power gateway may first check legitimacy of the parameter value. If the gateway parameter setting value is legitimate, the intelligent power gateway may update the corresponding parameter value of the gateway and return a parameter setting success identifier, and if the gateway parameter setting value is not legitimate, the intelligent power gateway may not change the parameter setting of the intelligent power gateway and return a parameter setting failure identifier. In addition, in a login state, the user may continuously update a plurality of parameter values of the intelligent power gateway until the user exits the login.

In this embodiment, when receiving the gateway parameter setting instruction, the power gateway acquires a gateway login password of the power gateway, and verifies the gateway login password. If the verification is successful, the power gateway obtains a gateway parameter setting value of the power gateway according to the gateway parameter setting instruction, and judges whether the gateway parameter setting value is legitimate. If the gateway parameter setting value is legitimate, the power gateway updates the gateway parameter according to the gateway parameter setting value, and returns an update success identifier, which can ensure legitimacy and validity of the parameter setting of the power gateway and improve reliability of data communication.

Figure 5:
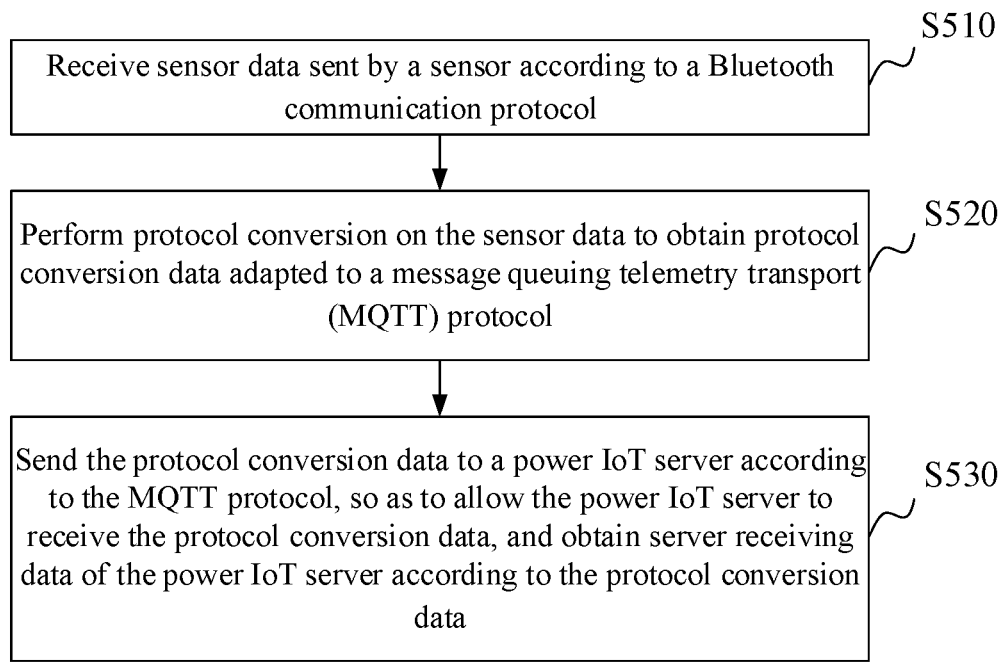
FIG. 5 is a schematic flowchart of a communication method for a power gateway according to an embodiment.

In an embodiment, as shown in FIG. 5, a schematic flowchart of a communication method for a power gateway is provided. For example, the method is applied to the power gateway 102 in FIG. 1, and includes the following steps.

In step S510, sensor data sent by a sensor is received according to a Bluetooth communication protocol.

In step S520, protocol conversion is performed on the sensor data to obtain protocol conversion data adapted to an MQTT protocol.

In step S530, the protocol conversion data is sent to a power IoT server according to the MQTT protocol, so as to allow the power IoT server to receive the protocol conversion data, and server receiving data of the power IoT server is obtained according to the protocol conversion data.

In specific implementation, the power gateway and the power IoT server may communicate with each other according to the MQTT protocol. The power gateway may be provided with a low power Bluetooth access layer, a protocol conversion control layer, and a wide area access layer. The power gateway may access the sensor through the low power Bluetooth access layer, and access the power IoT server through the wide area access layer. The power gateway, after receiving the sensor data through the low power Bluetooth access layer, may perform protocol conversion on the sensor data through the protocol conversion control layer to obtain the protocol conversion data. The protocol conversion data matches the MQTT protocol. The power gateway may transmit the protocol conversion data to the power IoT server through the wide area access layer according to the MQTT protocol. The power IoT server may also transmit data in the server to the power gateway according to the MQTT protocol.

Specific limitations on the above communication method for a power gateway may be obtained with reference to the limitations on the communication system for a power gateway hereinabove. Since the processing process of the power gateway has been described in detail in the foregoing embodiment, details are not described herein again In this embodiment, the sensor data sent by the sensor according to a Bluetooth communication protocol is received, which can reduce power consumption of communication between the sensor and the power gateway. Protocol conversion is performed on the sensor data to obtain protocol conversion data adapted to an MQTT protocol, which can improve efficiency of and reduce delay of communication between the power gateway and the power IoT server. The protocol conversion data is sent to the power IoT server according to the MQTT protocol, so as to allow the power IoT server to receive the protocol conversion data and obtain server receiving data of the power IoT server according to the protocol conversion data, which enables the communication system applied to the miniature intelligent sensor to have low power consumption, low delay, and higher transmission efficiency.

In an embodiment, the communication method may further include the following steps: performing a gateway initialization operation; when receiving a gateway parameter setting instruction sent by a user, performing gateway parameter setting of the power gateway according to the gateway parameter setting instruction; when receiving a label read/write instruction sent by the user, determining a sensor corresponding to the label read/write instruction to obtain a target sensor, so as to allow the power gateway to establish a data communication connection with the target sensor and perform a read/write operation on the target sensor according to the label read/write instruction; and if no gateway parameter setting instruction or label read/write instruction is received or the gateway parameter setting and the read/write operation is completed, scanning the broadcast channel according to the preset scan time interval and identifying the broadcast packet sent by the sensor.

In specific implementation, when the power gateway is powered off or reset and restarted, a turn-on operation is performed, and then the gateway initialization operation is performed to initialize a hardware system of the gateway. The power gateway can receive an instruction sent by the user through an Internet interface. The instruction sent by the user may include a gateway parameter setting instruction and a label read/write instruction. When receiving the gateway parameter setting instruction, the power gateway may start a gateway manager to perform a user-specified parameter setting operation. When receiving the label read/write instruction, the power gateway may start a label manager to establish a connection with a specified label and perform a user-specified label read/write operation. When not receiving a user instruction or completing a corresponding operation according to a user instruction, the power gateway may enter an automatic scan mode to perform a Bluetooth label broadcast data processing program, scan the broadcast channel according to the preset scan time interval, and identify the broadcast packet sent by the sensor. After completion of label broadcast data processing or when the power gateway exits the automatic scan mode, the power gateway may repeat the above process in this embodiment.

Specific limitations on the above communication method for a power gateway may be obtained with reference to the limitations on the communication system for a power gateway hereinabove. Since the processing process of the power gateway has been described in detail in the foregoing embodiment, details are not described herein again In this embodiment, a gateway initialization operation is performed; when a gateway parameter setting instruction sent by a user is received, gateway parameter setting of the power gateway is performed according to the gateway parameter setting instruction; when a label read/write instruction sent by the user is received, a sensor corresponding to the label read/write instruction is determined to obtain a target sensor, so as to allow the power gateway to establish a data communication connection with the target sensor, and a read/write operation is performed on the target sensor according to the label read/write instruction; and if the gateway parameter setting instruction and the label read/write instruction are not received or the gateway parameter setting and the read/write operation are not completed, the broadcast channel is scanned according to the preset scan time interval and identifies the broadcast packet sent by the sensor, which enables the communication between the sensor and the power gateway to have high reliability, low complexity, and low power consumption, enables the communication system applied to the miniature intelligent sensor to be easy to install, operate, and maintain, and reduces workload of operation and maintenance personnel in a power department.

Figure 6:
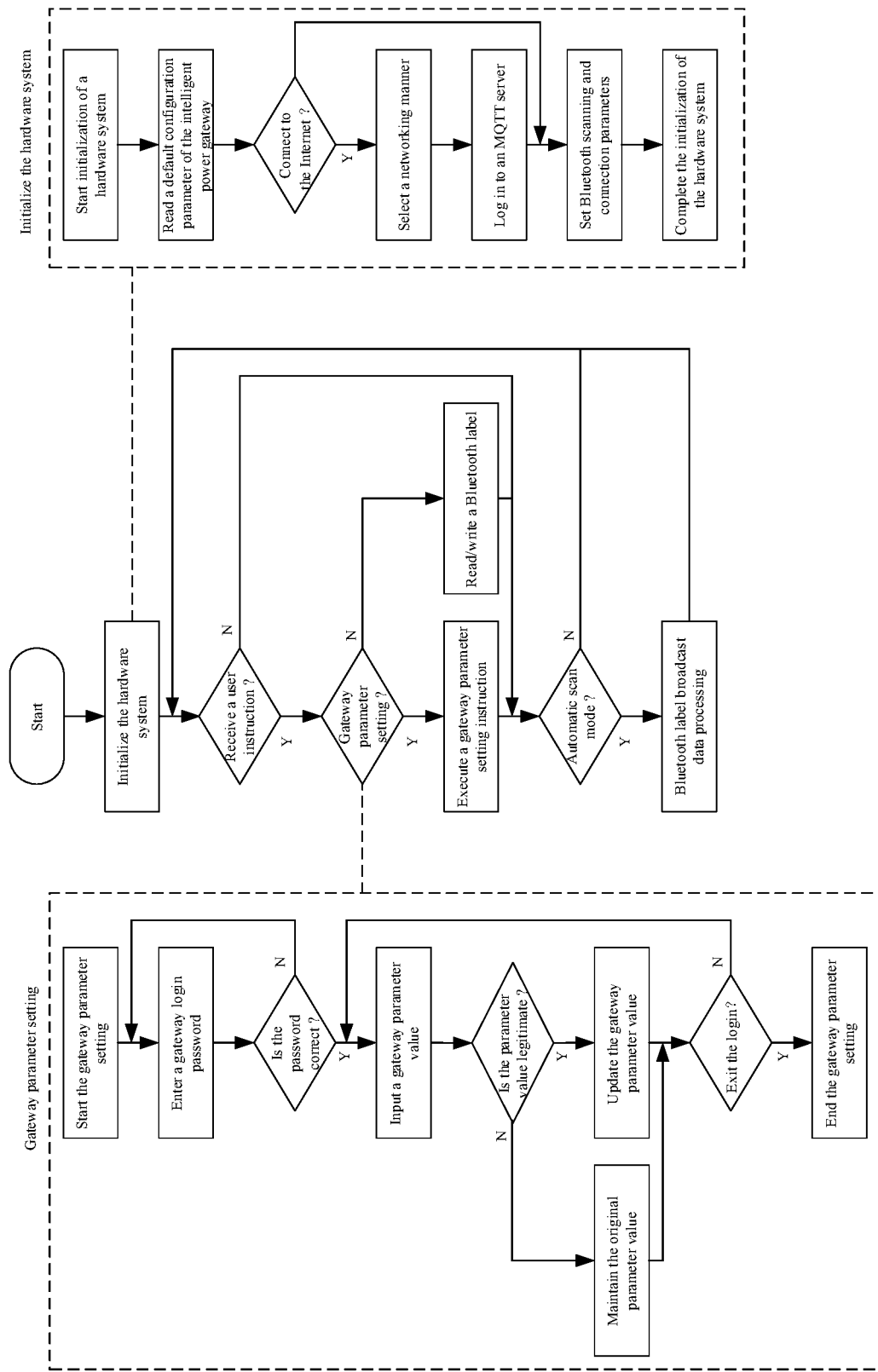
FIG. 6 is a schematic flowchart of the communication method for a power gateway according to another embodiment.

In an embodiment, as shown in FIG. 6, a schematic flowchart of a communication method for an intelligent power gateway is provided. The communication method may be implemented based on a low power Bluetooth protocol. The low power Bluetooth protocol may specifically include the conversion process of four communication states in the foregoing embodiment, the broadcast communication manner, and the GATT communication manner (as shown in FIG. 3). The communication method for an intelligent power gateway may specifically include the following steps.

1) Start: Implementation is mainly specific to power off or reset and restart of the intelligent power gateway.

2) Initialize a hardware system: Firstly, the power gateway may start an initialization program to initialize a main control chip, including cache allocation and communication interface initialization. Then, the main control chip initializes an Internet access module according to gateway parameter configuration information stored internally, including selection of a communication module (Ethernet, Wi-Fi, a GPRS, NB-IoT), establishment of TCP connection with an MQTT server, login, and the like. After successfully logging in to the MQTT server, the main control chip may start to initialize a low power Bluetooth module, including scanning parameter setting, connection parameter setting, and the like. Finally, the main control chip may control the low power Bluetooth module to start scanning or establish a connection with a Bluetooth label to complete initialization of the entire hardware and software system.

3) Receive a user instruction: The intelligent power gateway detects that an instruction sent by the user is received through an Internet interface, and enters the design of gateway parameters, and enters the automatic scan mode if no instruction is received from the user.

4) Set a gateway parameter: Processing on the user's parameter setting transactions for the intelligent power gateway mainly includes MQTT server domain name setting, TCP port setting, Wi-Fi SSID and password setting, gateway login password setting, networking mode selection, networking mode priority setting, gateway operation mode setting, Bluetooth scanning parameter setting, and Bluetooth connection parameter setting. In order to prevent unauthorized users from changing operation parameters of the intelligent power gateway, the user is required to first enter the gateway login password before changing operation parameters of the Bluetooth gateway. If the password is entered correctly, the intelligent power gateway may enter an operation parameter setting mode, and the user may update operation parameters of the gateway. When receiving a new parameter value, the intelligent power gateway may first check legitimacy of the parameter value. If the gateway parameter setting value is legitimate, the intelligent power gateway may update the corresponding parameter value of the gateway and return a parameter setting success identifier, and if the gateway parameter setting value is not legitimate, the intelligent power gateway may not change the parameter setting of the intelligent power gateway and return a parameter setting failure identifier. In addition, in a login state, the user may continuously update a plurality of parameter values of the intelligent power gateway until the user exits the login.

5) Process a gateway instruction: If an instruction sent by the user is received, different processing is performed according to different instruction types, and the automatic scan mode is entered upon completion of the processing. If the instruction is parameter setting, the system starts a gateway manager to perform user-specified parameter setting. If the instruction is a label read/write instruction, the system starts a label manager to establish a connection with a specified label and perform a user-specified read/write operation.

6) Automatic scan mode: If the intelligent power gateway operates in the automatic scan mode, the intelligent power gateway enters a Bluetooth label broadcast data processing program. After completion of label broadcast data processing or if the intelligent power gateway does not operate in the automatic scan mode, the intelligent power gateway repeats the above procedure.

In this embodiment, a more concise link layer state and communication protocol is designed through the low power Bluetooth protocol, which can reduce energy consumption of communication between the miniature intelligent sensor and the intelligent power gateway, make the system easy to install, operate, and maintain, and reduce workload of operation and maintenance personnel. A subscribe message between the intelligent power gateway and the power IoT server is transmitted through an MQTT communication protocol, which can ensure timeliness of information transmission, so that, after the power IoT server sends a control request, the target miniature intelligent sensor can perform the corresponding operation and respond fastest, and minimize the time of receiving a receipt, thereby quickly updating a use state of the link layer state and meeting a timely requirement of the power system. The intelligent power gateway can complete the operation of a plurality of devices in the entire power distribution room only by subscribing to one publication theme and one subscription theme, which is economical and practical, and can achieve the purpose of easy promotion. Moreover, the intelligent power gateway has the advantages of automatic activation, easy equipment addition, easy management of a plurality of power distribution rooms, simplification of an operation interface, and easy operation.

It is to be understood that, although the steps in the flowcharts of FIG. 5 and FIG. 6 are displayed in sequence as indicated by the arrows, the steps are not necessarily performed in the order indicated by the arrows. Unless otherwise clearly specified herein, the steps are performed without any strict sequence limitation, and may be performed in other orders. In addition, at least some steps in FIG. 5 and FIG. 6 may include a plurality of steps or a plurality of stages, and such steps or stages are not necessarily performed at a same moment, and may be performed at different moments. The steps or stages are not necessarily performed in sequence, and may be performed with other steps or at least part of steps or stages in the other steps in turn or alternately.

Figure 7:
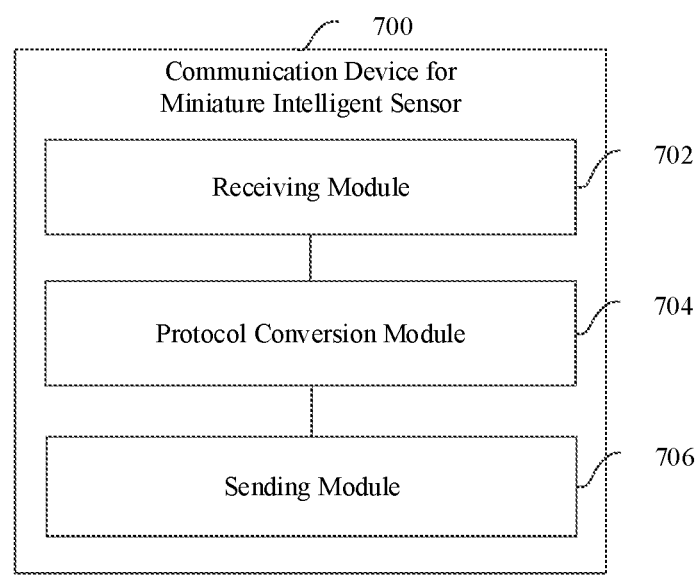
FIG. 7 is a block diagram illustrating a configuration of a communication device for a miniature intelligent sensor according to an embodiment.

In an embodiment, as shown in FIG. 7, a communication device 700 for a miniature intelligent sensor is provided, including a receiving module 702, a protocol conversion module 704, and a sending module 706.

The receiving module 702 is configured to receive sensor data sent by a sensor according to a Bluetooth communication protocol.

The protocol conversion module 704 is configured to perform protocol conversion on the sensor data to obtain protocol conversion data adapted to an MQTT protocol.

The sending module 706 is configured to send the protocol conversion data to a power IoT server according to the MQTT protocol, so as to allow the power IoT server to receive the protocol conversion data, and obtaining server receiving data of the power IoT server according to the protocol conversion data.

In an embodiment, the communication device 700 for a miniature intelligent sensor may further include:
an initialization module configured to perform a gateway initialization operation;
a parameter setting module configured to, when receiving a gateway parameter setting instruction sent by a user, perform gateway parameter setting of the power gateway according to the gateway parameter setting instruction;
a label read/write module configured to, when receiving a label read/write instruction sent by the user, determine a sensor corresponding to the label read/write instruction to obtain a target sensor, so as to allow the power gateway to establish a data communication connection with the target sensor and perform a read/write operation on the target sensor according to the label read/write instruction; and
a scanning module configured to, if no gateway parameter setting instruction or label read/write instruction is received or the gateway parameter setting and the read/write operation is completed, scan the broadcast channel according to a preset scan time interval and identify a broadcast packet sent by the sensor.

Specific limitations on the communication device for a miniature intelligent sensor may be obtained with reference to the limitations on the communication method for a miniature intelligent sensor hereinabove. Details are not described herein again. The modules in the communication device for a miniature intelligent sensor may be implemented entirely or partially by software, hardware, or a combination thereof. The above modules may be built in or independent of a processor of a computer apparatus in a hardware form, or may be stored in a memory of the computer apparatus in a software form, so that the processor invokes and performs operations corresponding to the above modules.

Figure 8:
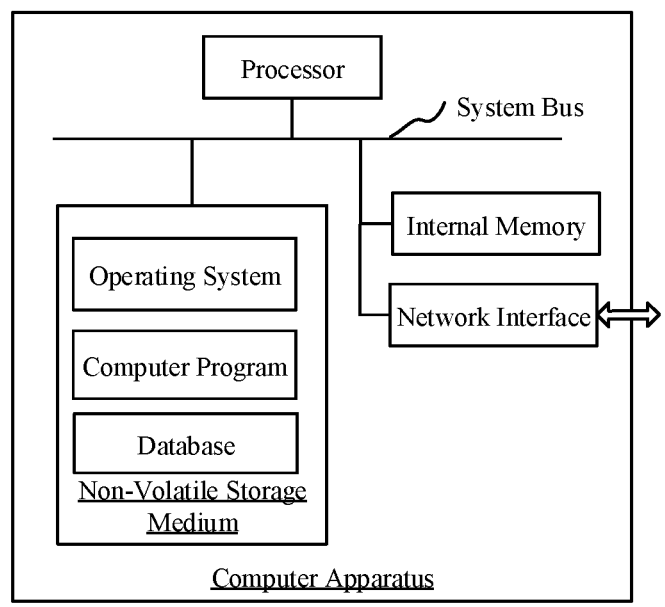
FIG. 8 is a diagram illustrating an internal configuration of a computer apparatus according to an embodiment.

In an embodiment, a computer apparatus is provided. The computer apparatus may be a server. A diagram of an internal configuration thereof is as shown in FIG. 8. The computer apparatus includes a processor, a memory, and a network interface that are connected by using a system bus. The processor of the computer apparatus is used for providing computing and control capabilities. The memory of the computer apparatus includes a non-volatile storage medium and an internal memory. The non-volatile storage medium stores an operating system, a computer program, and a database. The internal memory provides an environment for running of the operating system and the computer program in the non-volatile storage medium. The database of the computer apparatus is used for storing communication data for a miniature intelligent sensor. The network interface of the computer apparatus is used for communicating with an external terminal through a network connection. The computer program is executed by the processor to implement a communication method for a miniature intelligent sensor.

Those skilled in the art may understand that, in the configuration shown in FIG. 8, only a block diagram of a partial configuration related to the solution of the present application is shown, which does not constitute a limitation on the computer apparatus to which the solution of the present application is applied. Specifically, the computer apparatus may include more or fewer components than those shown in the figure, or some components may be combined, or a different component deployment may be used.

In an embodiment, a computer apparatus is provided, including a memory and a processor. The memory stores a computer program. The processor, when executing the computer program, implements the following steps: receiving sensor data sent by a sensor according to a Bluetooth communication protocol; performing protocol conversion on the sensor data to obtain protocol conversion data adapted to an MQTT protocol; and sending the protocol conversion data to a power IoT server according to the MQTT protocol, so as to allow the power IoT server to receive the protocol conversion data, and obtaining server receiving data of the power IoT server according to the protocol conversion data.

In an embodiment, the processor, when executing the computer program, further implements the following steps: performing a gateway initialization operation; when receiving a gateway parameter setting instruction sent by a user, performing gateway parameter setting of the power gateway according to the gateway parameter setting instruction; when receiving a label read/write instruction sent by the user, determining a sensor corresponding to the label read/write instruction to obtain a target sensor, so as to allow the power gateway to establish a data communication connection with the target sensor and perform a read/write operation on the target sensor according to the label read/write instruction; and if no gateway parameter setting instruction or label read/write instruction is received or the gateway parameter setting and the read/write operation is completed, scanning the broadcast channel according to the preset scan time interval and identifying the broadcast packet sent by the sensor.

In an embodiment, a computer-readable storage medium is provided, storing a computer program. The computer program, when executed by a processor, causes the processor to implement the following steps: receiving sensor data sent by a sensor according to a Bluetooth communication protocol; performing protocol conversion on the sensor data to obtain protocol conversion data adapted to an MQTT protocol; and sending the protocol conversion data to a power IoT server according to the MQTT protocol, so as to allow the power IoT server to receive the protocol conversion data, and obtaining server receiving data of the power IoT server according to the protocol conversion data.

In an embodiment, the computer program, when executed by the processor, further causes the processor to implement the following steps: performing a gateway initialization operation; when receiving a gateway parameter setting instruction sent by a user, performing gateway parameter setting of the power gateway according to the gateway parameter setting instruction; when receiving a label read/write instruction sent by the user, determining a sensor corresponding to the label read/write instruction to obtain a target sensor, so as to allow the power gateway to establish a data communication connection with the target sensor and perform a read/write operation on the target sensor according to the label read/write instruction; and if no gateway parameter setting instruction or label read/write instruction is received or the gateway parameter setting and the read/write operation is completed, scanning the broadcast channel according to the preset scan time interval and identifying the broadcast packet sent by the sensor.

Those of ordinary skill in the art may understand that some or all procedures in the methods in the foregoing embodiments may be implemented by a computer program instructing related hardware, the computer program may be stored in a non-volatile computer-readable storage medium, and when the computer program is executed, the procedures in the foregoing method embodiments may be implemented. Any reference to the memory, storage, database, or other media used in the embodiments provided in the present application may include at least one of a non-volatile memory and a volatile memory. The non-volatile memory may include a Read-Only Memory (ROM), a magnetic tape, a floppy disk, a flash memory, an optical memory, or the like. The volatile memory may include a Random Access Memory (RAM) or an external cache memory. By way of illustration instead of limitation, the RAM is available in a variety of forms, such as a Static Random Access Memory (SRAM), a Dynamic Random Access Memory (DRAM), or the like.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present application, and their description is specific and detailed, but cannot therefore be understood as a limitation on the patent scope of the invention. It should be noted that those of ordinary skill in the art may further make variations and improvements without departing from the conception of the present application, and these all fall within the protection scope of the present application. Therefore, the patent protection scope of the present application should be subject to the appended claims.

What is claimed is:

1. A communication system for a miniature intelligent sensor, the communication system comprising a sensor, a power gateway, and a power Internet of things (IoT) server, wherein:
   the sensor is configured to obtain sensor data and send the sensor data to the power gateway according to a Bluetooth communication protocol;
   the power gateway is configured to: receive the sensor data and perform protocol conversion on the sensor data to obtain protocol conversion data adapted to a message queuing telemetry transport (MQTT) protocol; and send the protocol conversion data to the power IoT server according to the MQTT protocol; and the power IoT server is configured to receive the protocol conversion data and obtain server receiving data of the power IoT server according to the protocol conversion data;

wherein the sensor is further configured to:
when the communication system is started, enter an initialization state to perform an initialization operation on the sensor; when the initialization operation is completed, switch from the initialization state to a standby state to allow the sensor to wait for a broadcast communication instruction; when receiving the broadcast communication instruction, switch from the standby state to a broadcast state to allow the sensor to establish a data communication connection with the power gateway; when the sensor establishes the data communication connection with the power gateway, switch from the broadcast state to a connection state to allow the sensor to perform data communication with the power gateway; and when the data communication is idle, return from the connection state to the standby state; and when switching from the standby state to the broadcast state, send a broadcast packet on a preset broadcast channel according to a preset broadcast time interval, the broadcast time interval comprising a fixed time interval and a pseudo-random time interval;

the power gateway is further configured to:
scan the broadcast channel according to a preset scan time interval and identify the broadcast packet sent by the sensor; and
perform a gateway initialization operation;
when receiving a gateway parameter setting instruction sent by a user, perform gateway parameter setting of the power gateway according to the gateway parameter setting instruction;
when receiving a label read/write instruction sent by the user, determine a sensor corresponding to the label read/write instruction to obtain a target sensor, so as to allow the power gateway to establish a data communication connection with the target sensor and perform a read/write operation on the target sensor according to the label read/write instruction; and
if no gateway parameter setting instruction or label read/write instruction is received or the gateway parameter setting and the read/write operation is completed, scan the broadcast channel according to the preset scan time interval and identify the broadcast packet sent by the sensor.

2. The communication system according to claim 1, wherein the sensor is further configured to, when switching from the broadcast state to the connection state, send a read/write characteristic value request to the power gateway; and
the power gateway is further configured to, when receiving the read/write characteristic value request, obtain a characteristic value according to the read/write characteristic value request, and feed the characteristic value back to the sensor.

3. The communication system according to claim 1, wherein the power gateway is further configured to, when the sensor is switched from the broadcast state to the connection state, acquire a characteristic value, and send the characteristic value to the sensor.

4. The communication system according to claim 1, wherein the gateway initialization operation comprises a server connection initialization operation and a sensor connection initialization operation;
wherein the power gateway is further configured to perform the server connection initialization operation, so as to allow the power gateway to establish a data communication connection with the power IoT server and log in to the power IoT server; and
wherein the power gateway is further configured to perform the sensor connection initialization operation, so as to allow the power gateway to scan the broadcast packet sent by the sensor, or establish a data communication connection with the sensor.

5. The communication system according to claim 1, wherein the power gateway is further configured to:
when receiving the gateway parameter setting instruction, acquire a gateway login password of the power gateway, and verify the gateway login password;
if the verification is successful, obtain a gateway parameter setting value of the power gateway according to the gateway parameter setting instruction, and judge whether the gateway parameter setting value is legitimate; andif the gateway parameter setting value is legitimate, update the gateway parameter according to the gateway parameter setting value, and return an update success identifier.

6. A communication method for a miniature intelligent sensor, the method comprising:
receiving sensor data sent by a sensor according to a Bluetooth communication protocol;
performing protocol conversion on the sensor data to obtain protocol conversion data adapted to an MQTT protocol;
sending the protocol conversion data to a power IoT server according to the MQTT protocol, so as to allow the power IoT server to receive the protocol conversion data, and obtaining server receiving data of the power IoT server according to the protocol conversion data;
performing a gateway initialization operation;
when receiving a gateway parameter setting instruction sent by a user, performing gateway parameter setting of the power gateway according to the gateway parameter setting instruction;
when receiving a label read/write instruction sent by the user, determining a sensor corresponding to the label read/write instruction to obtain a target sensor, so as to allow the power gateway to establish a data communication connection with the target sensor and perform a read/write operation on the target sensor according to the label read/write instruction; and
if no gateway parameter setting instruction or label read/write instruction is received or the gateway parameter setting and the read/write operation is completed, scanning the broadcast channel according to a preset scan time interval and identifying a broadcast packet sent by the sensor.

* * * * *